United States Patent [19]

Chaplin et al.

[11] Patent Number: 5,342,874

[45] Date of Patent: Aug. 30, 1994

[54] FLAME RETARDANT POLYMER FORMULATION

[75] Inventors: Dominic Chaplin, London; Rosemary Tingley, Slough, both of England

[73] Assignee: Alcan International Limited, Montreal, Canada

[21] Appl. No.: 54,956

[22] Filed: Apr. 29, 1993

Related U.S. Application Data

[63] Continuation of Ser. No. 807,869, Feb. 27, 1992, abandoned.

[30] Foreign Application Priority Data

Jul. 21, 1989 [GB] United Kingdom ............ 8916670.6

[51] Int. Cl.$^5$ .......................... C08K 3/22; C08K 3/20
[52] U.S. Cl. .................................. 524/430; 524/432; 524/436
[58] Field of Search .................. 524/430, 434, 436

[56] References Cited

U.S. PATENT DOCUMENTS 3,928,502  12/1975  Fabris et al. .................. 524/530

FOREIGN PATENT DOCUMENTS 0056248  5/1978  Japan ................... 524/434
0066006  4/1984  Japan ................... 524/430
0084342  5/1985  Japan ................... 524/430

OTHER PUBLICATIONS

Specialty Chemicals, vol. 9, No. 3, May/Jun. 1989, P. A. Cusack et al.: "Investigations into tin-based flame retardants and smoke suppressants," pp. 194, 196, 198, 200, 202.

Primary Examiner—Paul R. Michl
Assistant Examiner—Peter Szekely
Attorney, Agent, or Firm—Cooper & Dunham

[57] ABSTRACT

The invention describes a formulation for halogenated polymers without added antimony trioxide. The halogenated polymers contain a synergistic mix of flame retardants comprising 10–400 phv of an aluminum or magnesium hydroxide and 0.5–80 phv of trioxide or a metal stannate or hydroxystannate.

5 Claims, 1 Drawing Sheet

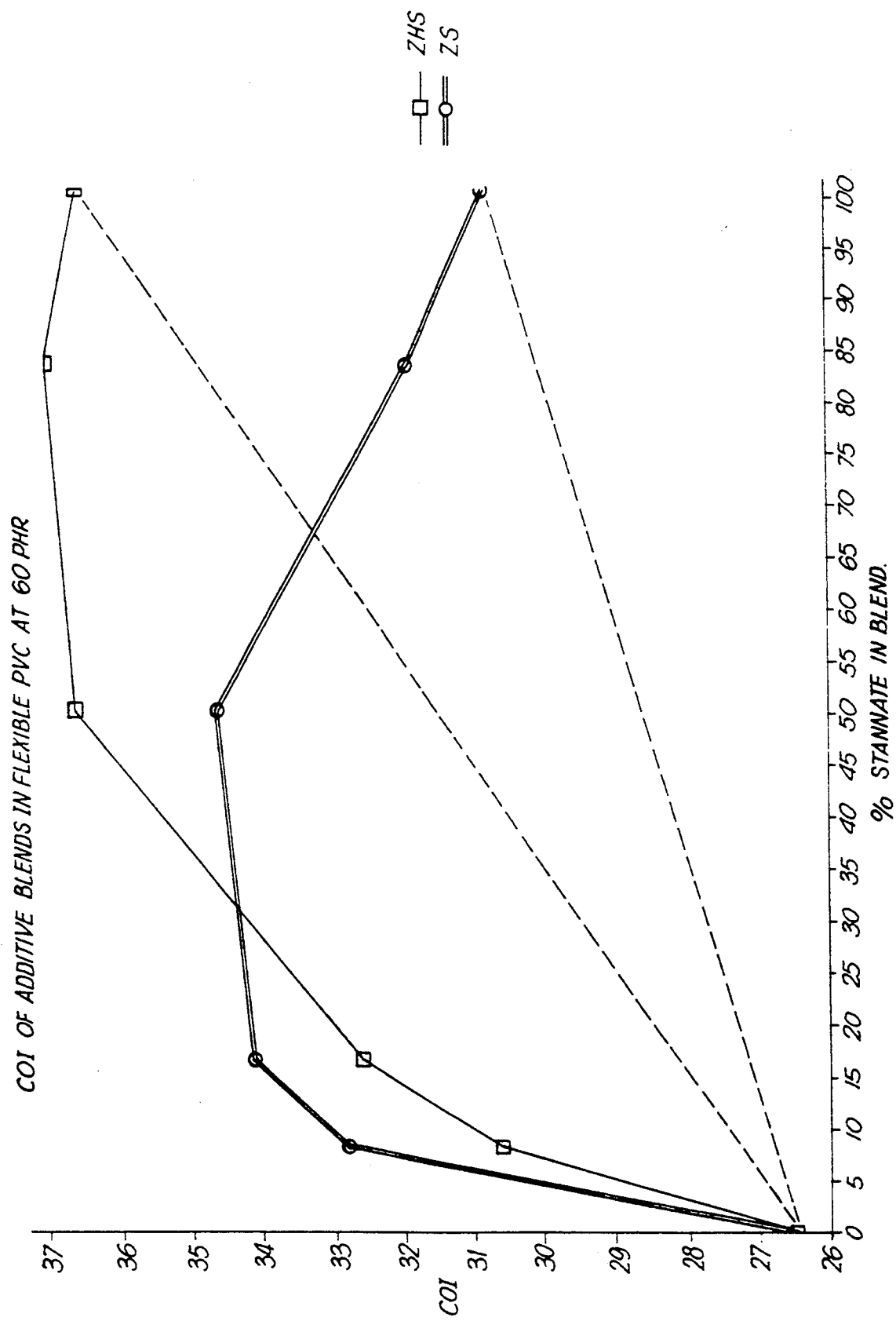

FLAME RETARDANT POLYMER FORMULATION

This is a continuation of application Ser. No. 807,869, filed Feb. 27, 1992 now abandoned.

It is estimated that in excess of 400,000 tons of flame retardant additives are used worldwide per year in polymer formulations. The main classes of additives are aluminium hydroxide, bromine and chlorine compounds, halogenated and non-halogenated phosphorus compounds, antimony oxides, and boron compounds. The most widely used of these additives, aluminium hydroxide, acts by decomposing endothermically giving off water vapour which cools the burning polymer and restricts oxygen flow to the flame. But aluminium hydroxide is only effective when used at high loadings, so high that the physical and other properties of the polymer may be adversely affected. There is a need for flame retardant combinations which would enable the loading of aluminium hydroxide to be reduced.

The flame-retardant action of chlorine and bromine compounds, either as physically incorporated additives to an organic polymer or as part of the polymer structure itself, is well established. Indeed, halogenated compounds find extensive commercial use as flame retardants, and these are often used in conjunction with synergists such as antimony trioxide and phosphorus derivatives. However, halogen containing polymers generally evolve large amounts of smoke and corrosive gases during combustion, and there is a need for fire retardant formulations which are also smoke-suppressant.

The International Tin Research Institute has been promoting the use of tin compounds as flame retardants. In a recent paper entitled "Investigations into tin-based flame retardants and smoke suppressants", P. A. Cusack and P. I. Fontaine of ITRI reported experiments in which tin compounds replaced antimony trioxide as a synergist in halogenated polyester resin formulations. The results showed that the stannates were superior to antimony trioxide, both as flame retardants and as smoke suppressants. In another section, the authors claim that flame-retardant synergism exists between tin compounds and aluminium trihydroxide in (non-halogenated) ethylene-acrylic rubber, but do not provide data to make good their claim.

This invention is based on the discovery that aluminium or magnesium hydroxide and tin oxide or a metal stannate or hydroxystannate form a synergistic flame retardant combination in halogenated polymer formulations. The invention is applicable to all halogenated organic polymer formulations, including particularly polyolefins and polyvinylchloride. Where the polymer itself is not halogenated, it is standard practice to include a chlorine or bromine compound, generally in an amount of from 1 to 30% by weight on the weight of the total formulation. For example, halogenated paraffin waxes are sold for this purpose under the Trademark CERECLOR.

The term aluminium hydroxide is here used to cover various compounds containing different proportions of Al, O and H, including alpha-aluminium trihydroxide, and alumina hydrate, often wrongly referred to as hydrated aluminium oxides. This component, or alternatively magnesium hydroxide, is used in the formulation at a concentration of 10 to 400 phr (parts per hundred of rubber or parts by weight per hundred parts by weight of the polymer) preferably 50 to 200 phr.

The other component of the flame retardant combination is an oxygen containing tin IV compound, which is tin oxide or a metal stannate or hydroxystannate. Metal stannates or hydroxystannates of a divalent metal such as Ca, Ba, Mg, Bi or particularly Zn, generally have the formula $MSnO_3$, $M_2SnO_4$ or $MSn(OH)_6$. Tin oxide has the formula $SnO_2$, this includes the mono and dihydrated forms. This component is used at a concentration of 0.5 to 80 phr preferably 1 to 25 phr.

As demonstrated below, synergistic effects between the two flame retardant components are observed at a wide range of ratios. In order to keep a desired balance of flame retardant properties, cost and mechanical and other properties of the polymer formulation, it is preferred to use he tin oxide or metal stannate or hydroxystannate in proportion of 3 to 50% by weight of the aluminum or magnesium hydroxide.

The flame retardant effect of an additive in a polymer formulation can be assessed by measuring the critical oxygen index (COI) by the method of BS 2782: Part 1, Method 1; 1986 (equivalent to ISO 4589–1984). If a combination of additives is used, then it may be predicted that, at a given additive combination loading the COI of the formulation will vary in linear dependence on the relative proportions of the flame retardants in the combination.

Reference is directed to the accompanying drawing, which is a graph of COI against % stannate in a fire retardant additive combination. The polymer is flexible PVC. The additive combination is aluminium hydroxide/zinc stannate (circles) or aluminium hydroxide/zinc hydroxystannate (squares). By comparison of the solid lines (observed) with the dotted lines (predicted on the basis of the above paragraph), a synergistic effect is clearly demonstrated.

The polymer formulations of this invention may contain other conventional ingredients including stabilisers and lubricants and other fire retardants/smoke suppressants. They may be thermoplastic or thermoset. They may be cast, moulded, extruded, foamed or treated in any other way which is conventional for polymer formulations. The following example illustrates the invention.

A standard PVC formulation was tested both with and without 50 phr aluminium hydroxide. To the filled polymer formulation were added various concentrations of zinc stannate, zinc hydroxystannate and antimony trioxide.

The critical oxygen index of each formulation was tested using the above standard procedures. Smoke production was measured in an NBS smoke chamber according to BS 6401: 1983, modified with half inch wire mesh placed in front of the sample to prevent molten sample fouling the furnace. 0.8 mm samples were used. Tabulated values indicate "Maximum Specific Optical Density $D_m$ Flaming".

Carbon monoxide CO was measured during combustion in the NBS smoke chamber, using a Telegon continuous carbon monoxide monitor. Results were recorded in p.p.m. 2 minutes after the start of the test.

EXAMPLE 1

The PVC formulation was:

| 100 phr | PVC | VY110/51 (K value 66) | Hydro Polymers |
|---|---|---|---|
| 50 phr | Plasticizer | REOMOL DOP | Ciba Geigy, |

-continued

| 100 phr | PVC | VY110/51 (K value 66) | Hydro Polymers |
|---|---|---|---|
| 4 phr | Stabilizer | IRGASTAB BC26 | di-iso-octyl phthalate Ciba Geigy E1 |
| 0.7 phr | Lubricant | IRGAWAX 371 | Ciba Geigy E2 |

Results are set out in the Table below.

| Composition | COI | Smoke $D_m$ | CO P.P.M. |
|---|---|---|---|
| No Filler | 23.5 | 371 | 560 |
| 50 phr Aluminium hydroxide | 25.6 | 294 | 427 |
| 50 phr + 6 phr $ZnSn(OH)_6$ | 30.6 | 280 | 658 |
| 50 phr + 8 phr $ZnSn(OH)_6$ | 31.4 | 262 | 650 |
| 50 phr + 10 phr $ZnSn(OH)_6$ | 32.4 | 242 | 603 |
| 50 phr + 6 phr $ZnSnO_3$ | 31.5 | 294 | 720 |
| 50 phr + 8 phr $ZnSnO_3$ | 33.0 | 279 | 702 |
| 50 phr + 10 phr $ZnSnO_3$ | 34.1 | 293 | 645 |
| 50 phr + 6 phr $Sb_2O_3$ | 32.6 | 388 | 928 |
| 50 phr + 8 phr $Sb_2O_3$ | 33.4 | 426 | 930 |
| 50 phr + 10 phr $Sb_2O_3$ | 34.2 | 450 | 937 |
| 6 phr $ZnSn(OH)_6$ | 27.0 | 354 | 767 |
| 8 phr $ZnSn(OH)_6$ | 28.5 | 362 | 783 |
| 10 phr $ZnSn(OH)_6$ | 28.8 | 376 | 784 |
| 6 phr $ZnSnO_3$ | 27.8 | 373 | 780 |
| 8 phr $ZnSnO_3$ | 28.8 | 378 | 831 |
| 10 phr $ZnSnO_3$ | 29.8 | 381 | 855 |
| 6 phr $Sb_2O_3$ | 30.2 | 405 | 768 |
| 8 phr $Sb_2O_3$ | 30.8 | 425 | 890 |
| 10 phr $Sb_2O_3$ | 31.1 | 445 | 1105 |

In conjunction with aluminium hydroxide, the zinc stannate and zinc hydroxystannate are seen to have several effects:
they significantly further increase the COI of the formulation.
unlike antimony trioxide, they reduce rather than increase smoke generation.
they result in production of considerably less carbon monoxide than when antimony trioxide is used.

EXAMPLE 2

Aluminium trihydroxide/calcium hydroxy stannate in flexible PVC.

Formulation

| 100 phr | PVC | VY110/51 | Hydro Polymers |
|---|---|---|---|
| 50 phr | Plasticizer | REOMOL DOP | Ciba Geigy E3 |
| 4 phr | Stabilizer | IRGASTAB BC26 | Ciba Geigy E4 |
| 0.7 phr | Lubricant | IRGAWAX 371 | Ciba Geigy E5 |

Results are set out in the table below.

| Phr ATH | Phr $CaSn(OH)_6$ | Critical Oxygen Index |
|---|---|---|
| 50 | 0 | 25.6 |
| 45 | 5 | 29.5 |
| 40 | 10 | 30.4 |
| 25 | 25 | 33.4 |
| 0 | 50 | 35.6 |

EXAMPLE 3

Magnesium hydroxide/zinc hydroxy stannate in flexible PVC.

Formulation

As Example 2 but instead of ATH and calcium hydroxy stannate:
0–100 phr Magnesium Hydroxide. Flamtard M7 B.A. Chemicals
0–100 phr $ZnSn(OH)_6$.

Results

| Phr $Mg(OH)_2$ | Phr $ZnSn(OH)_6$ | Critical Oxygen Index |
|---|---|---|
| 100 | 0 | 27.6 |
| 95 | 5 | 34.3 |
| 90 | 10 | 35.5 |
| 50 | 50 | 38.7 |
| 0 | 100 | 41.4 |

EXAMPLE 4

Mixtures of aluminium trihydroxide and tin oxide in flexible PVC.

Formulation

As Example 2 but instead of ATH and calcium hydroxy stannate:
a. $ATH/SnO_2$ blends 50 phr.
b. $ATH/SnO_2$ blends 100 phr.
c. $ATH/SnO_2$ blends 150 phr.

Results

| Phr ATH | Phr $SnO_2$ | Critical Oxygen Index |
|---|---|---|
| 50 | 0 | 25.6 |
| 40 | 10 | 27.9 |
| 32.5 | 17.5 | 31.7 |
| 25 | 25 | 34.2 |
| 0 | 50 | 34.2 |
| 100 | 0 | 29.6 |
| 65 | 35 | 34.8 |
| 50 | 50 | 44.0 |
| 0 | 100 | 40.2 |
| 150 | 0 | 34.8 |
| 97.5 | 52.5 | 48.2 |
| 75 | 75 | 55.5 |
| 0 | 150 | 45.7 |

EXAMPLE 5

Mixtures of aluminium trihydroxide and zinc hydroxy stannate in chlorinated rubber.

Formulation

| 100 phr | Chlorinated Rubber | Neoprene W | Du Pont |
|---|---|---|---|
| 4 phr | Magnesium Oxide | 'Light' | BDH |
| 0.5 phr | Stearic Acid | | |
| 5 phr | Zinc Oxide | '200' | Durham Chemicals |
| 2 phr | Curing Agent | MULTISPERSE E-ETV75P | Croxton and Garry E6 |
| 0–50 phr | ATH | SF7 | B A Chemicals |

| | |
|---|---|
| 0–50 phr | ZnSn(OH)$_6$ |

Results

| Phr ATH | Phr ZnSn(OH)$_6$ | Critical Oxygen Index |
|---|---|---|
| 50 | 0 | 50.6 |
| 45 | 5 | 52.5 |
| 40 | 10 | 55.0 |
| 25 | 25 | 58.0 |
| 10 | 40 | 55.6 |
| 0 | 50 | 51.0 |

EXAMPLE 6

Mixtures of aluminium hydroxide and zinc hydroxy stannate in unsaturated polyester.

Formulation

Unsaturated polyester resin. Synolite R557/44. DSM Resins UK Limited. This resin contains 27% wt of bromine. This was added to the resin as dibromo neopentyl glycol.

| | | |
|---|---|---|
| 100 phr | Synolite R557/44 | |
| 2 phr | SA11 ⅔ CURING AGENT E7 | |
| 1 phr | SC17 ⅔ E8 | |
| 0–50 phr | ATH FRF60 | B A Chemicals |
| 0–50 phr | ZnSn(OH)$_6$. | |

Results

| Phr ATH | Phr ZnSn(OH)$_6$ | Critical Oxygen Index |
|---|---|---|
| 50 | 0 | 40.6 |
| 48 | 2 | 50.1 |
| 45 | 5 | 54.8 |
| 25 | 25 | 66.8 |
| 0 | 50 | 53.3 |

If the results for Examples 2 to 6 are plotted as a graph of tin oxide or metal stannate/hydroxystannate content of the flame retardant additive V COI (as in FIG. 1) then an unwardly convex cure is obtained rather than the straight line expected, indicating a synergistic relationship.

What is claimed is:

1. A halogenated polymer formulation having flame retardant properties, said formulation containing a synergistic flame retardant combination consisting of 10–400 phr of an aluminum or magnesium hydroxide and 0.5–80 phr of a tetravalent tin compound which is a tin oxide or a metal stannate or hydroxystannate.

2. A formulation as claimed in claim 1, wherein the polymer is polyvinyl chloride.

3. A polymer as claimed in claim 1, wherein zinc stannate or hydroxystannate is used.

4. A formulation as claimed in claim 1, wherein there is used from 50–200 phr of aluminum trihydroxide and from 1–25 phr of zinc stannate or hydroxystannate.

5. A formulation as claimed in claim 1, wherein the tin oxide or metal stannate or hydroxystannate is used in a proportion of 3–50% by weight of aluminum or magnesium hydroxide.

* * * * *